United States Patent
Xu et al.

(10) Patent No.: US 10,995,902 B2
(45) Date of Patent: May 4, 2021

(54) MOBILE TERMINAL BRACKET

(71) Applicants: Beijing BOE Optoelectronics Technology Co., Ltd., Beijing (CN); BOE Technology Group Co., Ltd., Beijing (CN)

(72) Inventors: Bin Xu, Beijing (CN); Hao Wu, Beijing (CN); Xuzhong Liu, Beijing (CN); Na An, Beijing (CN); Zongwei Luo, Beijing (CN); Xiao Ma, Beijing (CN); Gang Ci, Beijing (CN); Baolei Guo, Beijing (CN); Xinfeng Gong, Beijing (CN); Shaopeng Xu, Beijing (CN); Zhenhua Luo, Beijing (CN); Zheng Zhang, Beijing (CN); Qingzhu Guan, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 97 days.

(21) Appl. No.: 16/332,891

(22) PCT Filed: May 11, 2018

(86) PCT No.: PCT/CN2018/086601
§ 371 (c)(1),
(2) Date: Mar. 13, 2019

(87) PCT Pub. No.: WO2018/228103
PCT Pub. Date: Dec. 20, 2018

(65) Prior Publication Data
US 2019/0257467 A1    Aug. 22, 2019

(30) Foreign Application Priority Data

Jun. 13, 2017    (CN) .......................... 201710443508.2

(51) Int. Cl.
F16M 13/02    (2006.01)
F16M 11/04    (2006.01)

(52) U.S. Cl.
CPC ............ *F16M 13/02* (2013.01); *F16M 11/04* (2013.01)

(58) Field of Classification Search
USPC ................ 248/200, 205.5, 309.1, 311.2, 310
See application file for complete search history.

(56) References Cited

U.S. PATENT DOCUMENTS 2,148,756 A * 2/1939 Keys .................... G03B 17/265
242/538.4
2,172,337 A * 9/1939 Mihalyi .................. G03B 19/04
396/446

(Continued)

FOREIGN PATENT DOCUMENTS

CN    200983141 Y    11/2007
CN    201698332 U    1/2011

(Continued)

OTHER PUBLICATIONS

Office Action for corresponding Chinese Application 201710443508.2 dated Sep. 4, 2018.

(Continued)

*Primary Examiner* — Alfred J Wujciak
(74) *Attorney, Agent, or Firm* — Arent Fox LLP; Michael Fainberg

(57) ABSTRACT

A mobile terminal bracket comprises: a support housing provided with a supporting cavity at front side thereof, the supporting cavity comprising a bottom wall, a first side wall and a second side wall opposite to each other, a third side wall and a fourth side wall opposite to each other, a protective film clearing hole on the first side wall, the second side wall provided with a fixing fastener, the third side wall and the fourth side wall separately provided with a sliding (Continued)

slot; a protective film retraction mechanism comprising a first roller in the support housing, a protective film twined on the first roller, a reset spring for rotating the first roller to reset, a pull rod connected to end of the protective film, the pull rod slidably assembled in the sliding slots of the third, fourth side wall and clipped to the fixing fastener.

10 Claims, 3 Drawing Sheets

(56) References Cited

U.S. PATENT DOCUMENTS

| | | | | | |
|---|---|---|---|---|---|
| 3,223,011 | A | * | 12/1965 | Hunt | G03B 17/30 |
| | | | | | 396/512 |
| 3,342,950 | A | * | 9/1967 | Schwarz | G11B 15/34 |
| | | | | | 360/90 |
| 3,365,817 | A | * | 1/1968 | MacFarlane | G09B 5/067 |
| | | | | | 434/314 |
| 3,404,057 | A | * | 10/1968 | Heiart | B32B 37/226 |
| | | | | | 156/522 |
| 3,488,496 | A | * | 1/1970 | Schneeman | G03B 42/021 |
| | | | | | 378/171 |
| 3,505,780 | A | * | 4/1970 | Haddix | B65B 11/12 |
| | | | | | 53/210 |
| 3,529,890 | A | * | 9/1970 | Buon | G03B 21/43 |
| | | | | | 352/78 R |
| 3,910,698 | A | * | 10/1975 | Sone | G03B 27/583 |
| | | | | | 355/54 |
| 4,030,818 | A | * | 6/1977 | Geisslinger | G03B 19/18 |
| | | | | | 352/72 |
| 4,152,053 | A | * | 5/1979 | Menary | G03D 15/00 |
| | | | | | 15/100 |
| 4,175,843 | A | * | 11/1979 | Douglas | G03B 17/04 |
| | | | | | 396/233 |
| 4,270,855 | A | * | 6/1981 | Douglas | G03B 19/023 |
| | | | | | 396/338 |
| 4,274,728 | A | * | 6/1981 | Waaske | G03B 17/30 |
| | | | | | 396/284 |
| 2019/0257467 | A1 | | 8/2019 | Xu et al. | |

FOREIGN PATENT DOCUMENTS

| | | |
|---|---|---|
| CN | 202114767 U | 1/2012 |
| CN | 103135770 A | 6/2013 |
| CN | 204761526 U | 11/2015 |
| CN | 106015872 A | 10/2016 |
| CN | 206194321 U | 5/2017 |
| CN | 107061964 A | 8/2017 |
| DE | 202011101521 U | 2/2012 |
| JP | 07168647 A | 7/1995 |

OTHER PUBLICATIONS

International Search Report for PCT/CN2018/086601 dated Jul. 19, 2018.

* cited by examiner

MOBILE TERMINAL BRACKET

This application is a National Stage of International Application No. PCT/CN2018/086601, filed on May 11, 2018, which claims the priority of Chinese Patent Application No. 201710443508.2, filed with the Chinese Patent Office on Jun. 13, 2017, and entitled "A mobile terminal bracket", both of which are hereby incorporated by reference in their entireties.

FIELD

The present disclosure relates to the field of mobile terminals, and particularly to a mobile terminal bracket.

BACKGROUND

As our living is improving, a mobile phone has become a mobile device indispensable to our daily life. The mobile phone is typically not provided with a waterproof function, so if it operates in a bathroom or another vapor-rich environment, then electronic elements therein may be damaged.

SUMMARY

An embodiment of this disclosure provides a mobile terminal bracket including:

a support housing including a supporting cavity, the supporting cavity is on a front side of the support housing, wherein the supporting cavity includes a bottom wall, a first sidewall and a second sidewall, and a third sidewall and a fourth sidewall, the first sidewall and the second sidewall are opposite to each other, the third sidewall and the fourth sidewall are opposite to each other, the first sidewall includes a protective film clearing hole, the second sidewall is arranged with a fixing fastener, and the third sidewall and the fourth sidewall are arranged respectively with sliding slots; and a protective-film retractable mechanism including a first roller in the support housing, a protective film wound on the first roller, a resetting spring configured to rotate the first roller into a reset position, and a pull rod connected with an end of the protective film, wherein the pull rod is slidably installed in the sliding slots of the third sidewall and the fourth sidewall, and engaged with the fixing fastener.

Optionally, the mobile terminal bracket further includes a second roller in the support housing, and the second roller abuts against the back surface of the protective film.

Optionally, the first sidewall of the supporting cavity includes an outlet grid, the mobile terminal bracket further includes a fan in the support housing, and the fan is provided with an air exit side facing the outlet grid, and the fan includes a switch protruding out of the support housing.

Optionally, the outlet grid is arranged facing the bottom wall of the supporting cavity.

Optionally, the fan switch is arranged on the front side of the support housing.

Optionally, the mobile terminal bracket further includes an anti-sliding buffer pad on a front side of the bottom wall of the support rest-slot.

Optionally, the bottom wall of the supporting cavity is inclined toward an inside of the support housing.

Optionally, the mobile terminal bracket further includes a Bluetooth speaker in the support housing, and the support housing includes a sound emitting hole positioned facing a sound emission side of the Bluetooth speaker.

Optionally, the sound emitting hole is arranged at the bottom of the support housing.

Optionally, the mobile terminal bracket further includes a sucking disk arranged on a backside of the support housing.

DETAILED DESCRIPTION OF THE EMBODIMENTS

In order to enable a mobile terminal to be applicable to a vapor-rich environment, and to extend an applicable scope of the mobile terminal, embodiments of the disclosure provide a mobile terminal bracket. In order to make the objects, the technical solutions, and the advantages of this disclosure more apparent, this disclosure will be described below in further details with reference to the embodiments thereof.

Figure 1:
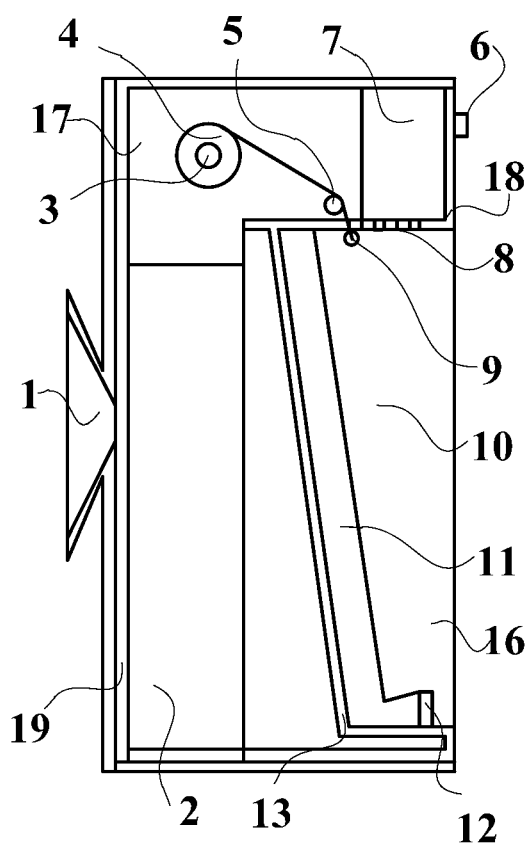
FIG. 1 is a schematic diagram of a mobile terminal bracket according to an embodiment of this disclosure in a side sectional view.
Figure 2:
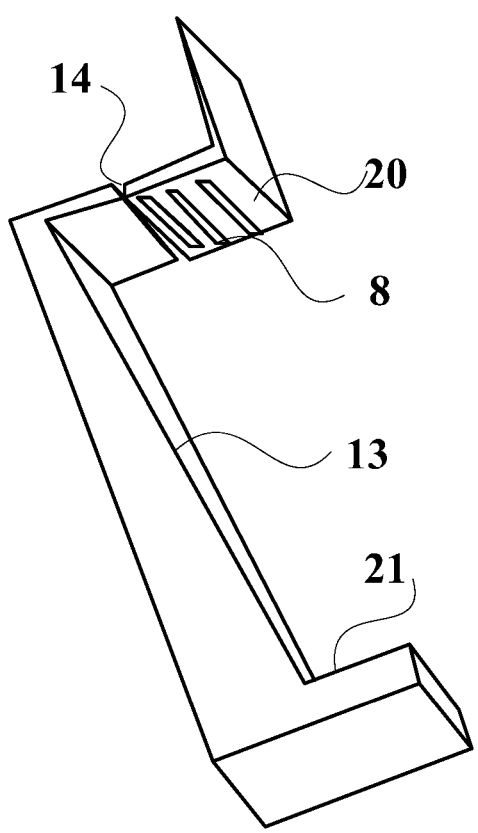
FIG. 2 is a schematic structural diagram of a front housing of the mobile terminal bracket according to the embodiment of this disclosure.
Figure 3:
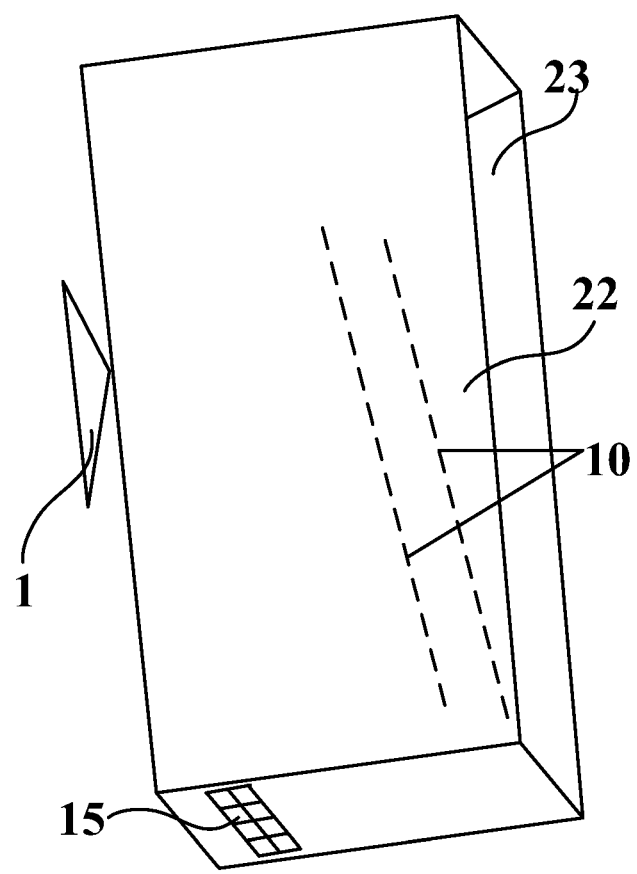
FIG. 3 is a schematic structural diagram of a back housing of the mobile terminal bracket according to the embodiment of this disclosure.

As illustrated in FIG. 1 to FIG. 3, an embodiment of this disclosure provides a mobile terminal bracket including a support housing 17 including a supporting cavity 16 on the front side thereof, where the supporting cavity 16 includes a bottom wall 13, a first sidewall 20 and a second sidewall 21 opposite to each other, and a third sidewall 22 and a fourth sidewall 23 opposite to each other, the first sidewall 20 includes a protective film clearing hole 14, the second sidewall 21 is arranged with a fixing fastener 12, and the third sidewall 22 and the fourth sidewall 23 are arranged respectively with sliding slots 10; and the mobile terminal bracket further includes a protective-film retractable mechanism including a first roller 3 located in the support housing 17, a protective film 4 wound on the first roller 3, a resetting spring configured to rotate the first roller 3 into the reset position (not illustrated), and a pull rod 9 connected with the end of the protective film 4, where the pull rod 9 is slidably installed in the sliding slots 10 of the third sidewall 22 and the fourth sidewall 23, and can be engaged with the fixing fastener 12.

In an embodiment of this disclosure, the side of the mobile terminal bracket in operation facing a user is referred to as a front side, and the side thereof away from the user is referred to as a back side. As illustrated in FIG. 1 to FIG. 3, the first sidewall 20 and the second sidewall 21 supporting the rest groove 16 are a top wall and a bottom wall respectively, and the third sidewall 22 and the fourth sidewall 23 are a left sidewall and a right sidewall respectively. In order to put out the protective film 4 through the pull rod 9, it is put out from the top to the bottom, and then the pull rod 9 is engaged on the fixing fastener 12 at the bottom wall of the supporting cavity 16. In another embodiment of this disclosure, the top wall and the bottom wall of the supporting cavity 16 can alternatively be arranged respectively as the third sidewall 20 and the second sidewall 21, and at this time, in order to put out the protective film 4 through the pull rod 9, it is put out from the left to the right, and then the pull rod is engaged on the fixing fastener 12 at the left sidewall of the supporting cavity.

With the mobile terminal bracket according to the embodiment of this disclosure, in order to operate a mobile terminal in a moisture-rich environment, firstly the back of the mobile terminal is rested on the bottom wall 13 of the supporting cavity 16, and then the pull rod 9 is pulled out and engaged on the fixing fastener 12, and at this time, the protective film 4 covers the front surface of the mobile terminal to seal the supporting cavity 16 for the waterproof and moisture-proof effect so as to protect in effect the mobile terminal from being damaged.

Neither the particular shape nor the particular structure of the support housing 17 will be limited, and as illustrated in FIG. 1 to FIG. 3, two components including a front housing 18 and a back housing 19 are assembled into the support housing 17 of the mobile terminal bracket according to the embodiment of this disclosure. With this design, the housing can be disassembled conveniently.

Optionally, the rest side 13 of the supporting cavity 16 is inclined toward the inside of the support housing 17, thus making it more convenient to fix the mobile terminal, and also satisfying a demand of the watching user for an angle of view.

In an embodiment of this disclosure, the mobile terminal bracket further includes a second roller 5 located in the support housing 17, and abutting against the back surface of the protective film 4. The second roller 5 can tension the part of the protective film 4 located on the support housing 17 to thereby improve the planarity of the part of the protective film 4, which is put out, so as to improve the display effect and the touch effect of the mobile terminal through the protective film 4.

In an embodiment of this disclosure, there is an outlet grid 8 on the first sidewall 20 of the supporting cavity 16, the mobile terminal bracket further includes a fan 7 located in the support housing 17, and with an air exit side facing the outlet grid 8, and the fan 7 includes a fan switch 6 protruding out of the support housing 17. Air blown out of the fan 7 can dry accumulated water on the front surface of the part of the protective film 4, which is put out, in a timely manner to thereby improve the display effect and the touch effect of the mobile terminal through the protective film 4.

Optionally, the outlet grid 8 is arranged facing the bottom wall 13 of the supporting cavity 16 so that the accumulated water on the front surface of the part of the protective film 4, which is put out can be dried by the air more quickly. As illustrated in FIG. 2, in some embodiment, there is some angle between the bottom wall 13 of the supporting cavity 16, and the horizontal direction, and in order to enable the air blown out of the fan 7 to dry the accumulated water on the front surface of the part of the protective film 4, which is put out, more quickly, the outlet grid 8 can be arranged vertically at this time.

Optionally, the fan switch 6 is arranged on the front side of the support housing 17 so that the accumulated water can be alleviated from influencing the switch, to thereby prolong the service lifetime of the fan.

In an embodiment of this disclosure, the mobile terminal bracket further includes an anti-sliding buffer pad 11 arranged on the front side of the rest front 13 of the support reset-groove 16. The anti-sliding buffer pad 11 can fix in effect the mobile terminal, and can avoid the mobile terminal from being scratched, and the anti-sliding buffer pad 11 can make the screen of the mobile terminal attached firmly with the protective film 4 to thereby further improve the display effect and the touch effect of the mobile terminal through the protective film.

In an embodiment of this disclosure, the mobile terminal bracket can further include a Bluetooth speaker 2 located in the support housing 17, and the support housing 17 includes a sound emitting hole 15 positioned facing the sound emission side of the Bluetooth speaker 2. The Bluetooth speaker 2 can be Bluetooth-connected wirelessly with the mobile terminal to thereby provide more functions of the mobile terminal bracket.

As illustrated in FIG. 3, optionally, the sound emitting hole 15 is arranged at the bottom of the support housing 17 so that the accumulated water can be prevented from entering the support housing 17 to thereby prolong the service lifetime of the Bluetooth speaker 2.

In an embodiment of this disclosure, the mobile terminal bracket further includes a sucking disk 1 arranged on the backside of the support housing 17. With this design, the mobile terminal bracket can be placed on a platform, but also can be absorbed on the wall through the sucking disk 1 to thereby making it more convenient and flexible to operate the mobile terminal bracket.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A mobile terminal bracket, comprising:
a support housing comprising a supporting cavity which is on a front side of the support housing, wherein the supporting cavity comprises a bottom wall, a first sidewall and a second sidewall, and a third sidewall and a fourth sidewall, the first sidewall and the second sidewall are opposite to each other; the third sidewall and the fourth sidewall are opposite to each other, the first sidewall comprises a protective film clearing hole, the second sidewall is arranged with a fixing fastener, and the third sidewall and the fourth sidewall are arranged respectively with slots; and
a protective-film retractable mechanism comprising a first roller in the support housing, a protective film wound on the first roller, a resetting spring configured to rotate the first roller into a reset position, wherein the spring is mounted on one of the sidewalls and connected to an end of the first roller to provide tension, and a pull rod connected with an end of the protective film, wherein the pull rod is slidably installed in the slots of the third sidewall and the fourth sidewall, and engaged with the fixing fastener; wherein the first roller is supported by the third sidewall and the fourth sidewall.

2. The mobile terminal bracket according to claim 1, further comprising a second roller in the support housing, and the second roller abuts against a back surface of the protective film.

3. The mobile terminal bracket according to claim 1, wherein the first sidewall of the supporting cavity comprises an outlet grid, the mobile terminal bracket further comprises a fan in the support housing, and the fan is provided with an air exit side facing the outlet grid, and the fan comprises a switch protruding out of the support housing.

4. The mobile terminal bracket according to claim 3, wherein the outlet grid is arranged facing the bottom wall of the supporting cavity.

5. The mobile terminal bracket according to claim 3, wherein the fan switch is arranged on a front side of the support housing.

6. The mobile terminal bracket according to claim 1, further comprising an anti-sliding buffer pad arranged on a front side of the bottom wall of the support rest-slot.

7. The mobile terminal bracket according to claim 1, wherein the bottom wall of the supporting cavity is inclined toward an inside of the support housing.

8. The mobile terminal bracket according to claim 1, further comprising a Bluetooth speaker in the support housing, and the support housing comprises a sound emitting hole positioned facing a sound emission side of the Bluetooth speaker.

9. The mobile terminal bracket according to claim 8, wherein the sound emitting hole is at the bottom of the support housing.

10. The mobile terminal bracket according to claim 1, further comprising a sucking disk on a backside of the support housing.

* * * * *